(12) United States Patent
Rini et al.

(10) Patent No.: US 8,775,008 B2
(45) Date of Patent: Jul. 8, 2014

(54) ELECTRICAL SYSTEM HEALTH MONITOR (ESHM) SYSTEM AND METHOD

(71) Applicants: Guy T. Rini, Winchester, VA (US);
Charles J. Groeller, Orefield, PA (US);
Dale B. Henningson, Manti, UT (US)

(72) Inventors: Guy T. Rini, Winchester, VA (US);
Charles J. Groeller, Orefield, PA (US);
Dale B. Henningson, Manti, UT (US)

(73) Assignee: GTR Development LLC, Winchester, VA (US)

( * ) Notice: Subject to any disclaimer, the term of this patent is extended or adjusted under 35 U.S.C. 154(b) by 0 days.

(21) Appl. No.: 13/713,807

(22) Filed: Dec. 13, 2012

(65) Prior Publication Data
US 2013/0158776 A1    Jun. 20, 2013

Related U.S. Application Data

(60) Provisional application No. 61/570,640, filed on Dec. 14, 2011.

(51) Int. Cl.
*G06F 17/00* (2006.01)
(52) U.S. Cl.
USPC .......................................... 701/29.4; 396/48
(58) Field of Classification Search
USPC ................. 701/29.4; 324/72, 433, 429, 426; 320/116, 103, 104; 396/48
See application file for complete search history.

(56) References Cited

U.S. PATENT DOCUMENTS

| | | | |
|---|---|---|---|
| 6,150,793 A | 11/2000 | Lesesky et al. | |
| 7,728,599 B2 * | 6/2010 | Tae et al. | 324/433 |
| 7,990,155 B2 | 8/2011 | Henningson | |
| 7,999,505 B2 * | 8/2011 | Bertness | 320/104 |
| 8,164,342 B2 * | 4/2012 | Henrichsen et al. | 324/500 |
| 2010/0320021 A1 | 12/2010 | Rini et al. | |

* cited by examiner

*Primary Examiner* — Marthe Marc-Coleman
(74) *Attorney, Agent, or Firm* — Anova Law Group, PLLC

(57) ABSTRACT

An engine-powered vehicle includes an engine, a battery corresponding to a battery voltage, a starter, an alternator, a plurality of switchable electrical loads, a key switch configured to control the switchable electrical loads and corresponding to a key voltage, and an electrical system health monitor (ESHM) controller. The ESHM controller is configured to monitor a plurality of voltages, to determine an operating state based on the plurality of voltages, and to determine whether an operating state is a valid operating state or a fault state. The ESHM controller is configured to set a fault alert for vehicle maintenance when the operating state is a fault state and, when the operating state is a valid operating state, to monitor a predetermined set of input parameters corresponding to the operating state, to detect certain anomalies based voltage waveforms of the plurality of voltages, and to perform a corrective action based on the anomalies.

20 Claims, 5 Drawing Sheets

| Key | Engine On | Contactor | Starter | Description/Comment |
|---|---|---|---|---|
| 0 | 0 | 0 | 0 | Park: normal state while stationary or parked |
| 0 | 0 | 0 | 1 | Fault mode |
| 0 | 0 | 1 | 0 | Timeout State – Transitions to 0,0,0,0 state at end of period |
| 0 | 0 | 1 | 1 | Fault mode – (starter engages without key switch) |
| 0 | 1 | 0 | 0 | Fault mode |
| 0 | 1 | 0 | 1 | Fault mode |
| 0 | 1 | 1 | 0 | Transition state to 0,0,1,0 or fault (alternator supplying power without battery connection) |
| 0 | 1 | 1 | 1 | Fault mode with engine running |
| 1 | 0 | 0 | 0 | Transition state to 1,0,1,0 or fault |
| 1 | 0 | 0 | 1 | Fault mode |
| 1 | 0 | 1 | 0 | Accessory state-stationary, key ON, Engine OFF |
| 1 | 0 | 1 | 1 | Start mode – normal operation |
| 1 | 1 | 0 | 0 | Fault mode |
| 1 | 1 | 0 | 1 | Fault mode (alternator supplying power without battery connection) |
| 1 | 1 | 1 | 0 | Run state- motoring or stationary with engine on |
| 1 | 1 | 1 | 1 | End of start sequence of fault |

ELECTRICAL SYSTEM HEALTH MONITOR (ESHM) SYSTEM AND METHOD

CROSS-REFERENCES TO RELATED APPLICATIONS

This application claims the priority of U.S. Provisional Application No. 61/570,640, filed on Dec. 14, 2011, the entire contents of which are incorporated herein by reference.

FIELD OF THE INVENTION

The present invention relates to the field of electrical system health monitoring (ESHM) technologies and, more particularly, to techniques for ESHM used in vehicle electrical systems.

BACKGROUND

The medium and heavy duty vehicle markets have traditionally used two types of maintenance practices for maintaining vehicle electrical systems. One method is to provide corrective maintenance when a failure occurs. For example, on-board electronic systems perform electrical system checks and create active faults for the driver or maintenance technician.

The second method is to provide preventive vehicle maintenance on a predefined schedule of mileage intervals or of operational or time intervals. The preventive maintenance is scheduled before a fault occurs. Repair, replacement of components, or cleaning of electrical terminals "re-sets" the vehicle system back to like-new conditions. This approach is an attempt to preempt road breakdowns and the interrupts of normal operation when a failure occurs. While this procedure may work at keeping a vehicle in service, it does have a higher cost because in general more maintenance is performed than what is required.

The industry is now embracing the concept of Condition Based Maintenance (CBM). CBM is the optimal-level of vehicle maintenance, and performed at the proper time. CBM utilizes real-time data to prioritize and optimize maintenance resources. Such a system can determine the equipment's health, and act only when maintenance is necessary.

However, CBM is not utilized for major electrical components, such as batteries (usually two or more in parallel), starters, alternators, and supporting hardware including cables and wiring. Instead, preventive maintenance are used for diagnoses. Industry standards, such as TMC RP129 "Heavy Duty Vehicle Cranking and Starting Troubleshooting" and TMC RP132 "Battery Charging, Testing and Handling" describe the procedures to follow for proper diagnoses.

RP129 is a maintenance procedure performed by a technician with off-board test equipment. First, the batteries are charged and evaluated. Then a special automated (electronic) tester or carbon pile resistor is used to load down the circuit so high amperage can be drawn from the battery. The technician ensures the prescribed current is maintained while the voltages are recorded. This allows for the voltage dropped across the circuit(s) be measured directly or calculated based on other measurements taken. By using an assortment of tests, the battery, cranking circuit, and charging circuit are diagnosed.

However, the existing CBM techniques may still require off-board testing, which may be impractical under certain circumstances. The disclosed methods and systems are directed to solve one or more problems set forth above and other problems.

BRIEF SUMMARY OF THE DISCLOSURE

One aspect of the present disclosure includes an engine-powered vehicle. The vehicle includes an engine for providing power to the vehicle, a battery configured to provide electrical power and corresponding to a battery voltage indicating an output voltage of the battery, and a starter configured to start the engine using the electrical power provided by the battery and an alternator to power the electrical system and recharge the battery. The vehicle also includes a plurality of switchable electrical loads, a key switch configured to control the electrical power to the switchable electrical loads and corresponding to a key voltage indicating a voltage at the key switch output, and an electrical system health monitor (ESHM) controller. The ESHM controller is configured to monitor a plurality of voltages including at least the battery voltage and the key voltage and to determine an operating state based on the plurality of voltages. The ESHM controller is also configured to determine whether an operating state is a valid operating state or a fault state. When the operating state is a fault state, the ESHM controller is configured to set a fault alert for vehicle maintenance. When the operating state is a valid operating state, the ESHM controller is configured to monitor a predetermined set of input parameters corresponding to the operating state, to detect certain anomalies based voltage waveforms of the plurality of voltages, and to perform a corrective action based on the anomalies.

Another aspect of the present disclosure includes a method for an on-board ESHM system in an engine-powered vehicle. The vehicle includes an engine for proving power to the vehicle, a starter for starting the engine, an alternator for recharging the battery and a plurality of electrical loads before the vehicle key and also key switched loads. The method includes monitoring a plurality of voltages including at least the battery voltage and the key voltage, determining an operating state based on the plurality of voltages, and determining whether an operating state is a valid operating state or a fault state. The method also includes setting a fault alert for vehicle maintenance when the operating state is a fault state and, when the operating state is a valid operating state, monitoring a predetermined set of input parameters corresponding to the operating state, detecting certain anomalies based voltage waveforms of the plurality of voltages, and performing a corrective action based on the anomalies.

Other aspects of the present disclosure can be understood by those skilled in the art in light of the description, the claims, and the drawings of the present disclosure.

BRIEF DESCRIPTION OF THE DRAWINGS

FIG. 4 illustrates an exemplary state diagram of an ESHM system consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
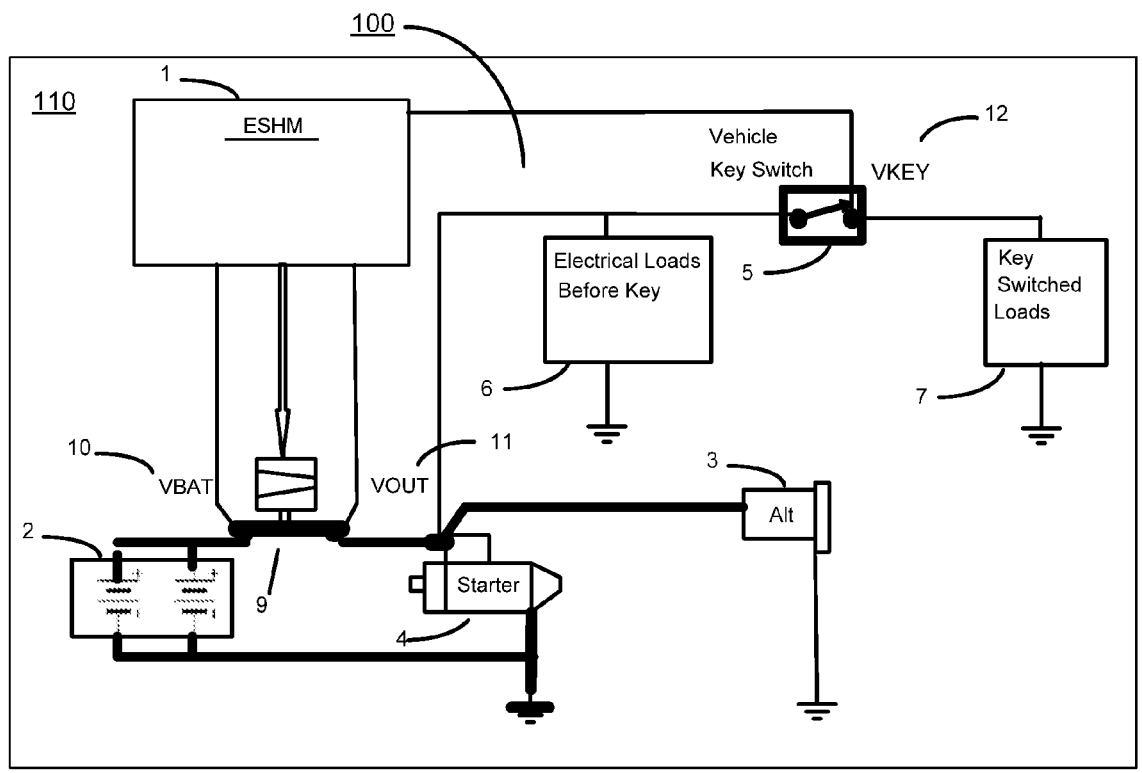
FIG. 1 illustrates an exemplary electrical system health monitor (ESHM) system consistent with the disclosed embodiments.

FIG. 1 shows exemplary on-board ESHM system 100 incorporated into vehicle 110. As shown in FIG. 1, vehicle 110 may include any appropriate mobile machine designed to transport passengers or cargo over land, sea, and air. Vehicle 110 may include an engine (not shown), electrical systems (not shown), and the on-bard ESHM system 100, etc. The engine may provide power to the vehicle 110, and the electrical systems may be controlled by one or more electrical control unit (ECU).

On-board ESHM system 100 may be contained or included in vehicle 110. The on-board ESHM system 100 is predominantly an ESHM controller 1 (or simply ESHM 1) and battery contactor 9 which is electrically coupled to the vehicle battery 2, alternator 3, starter 4, vehicle key switch 5, electrical loads before key 6, and key switched loads 7. Certain devices may be omitted and other devices may be added.

The ESHM 1, vehicle battery 2, alternator 3, starter 4, and the vehicle key switch 5, and the electrical loads before key 6 and key switched loads 7 are electrically coupled together. Electrical loads before key 6, as used herein, refer to all or a substantial number of devices, electronics and control systems fused or un-fused, such as headlights, hazard warning lights and other electrical loads, that are controlled and powered independently of the key switch. Key switched loads 7, as used herein, refer to all or a substantial number of devices, electronics and control systems fused or un-fused that are operative only when the key is on.

Vehicle battery 2 may include any appropriate battery module or modules used in a vehicle, and more than one battery may be included in vehicle battery 2. Vehicle battery 2 may provide power for the engine to start and power to electrical systems during normal engine on/off time.

Alternator 3 may include any appropriate device converting other forms of energy into electrical energy. For example, alternator 3 may include one or more vehicle alternator(s). Starter 4 may include any appropriate device to start a motor on board a vehicle. Starter 4 may start the engine based on power provided by vehicle battery 2.

Further, vehicle key switch 5 may include any key or keyless switch used by a vehicle to turn on or off certain power supply on board the vehicle. As mentioned above, key switched loads 7 may refer to all or a substantial number of devices electronics, and control systems that receive power only when the key switch in closed ("ON"), i.e., loads controlled and powered by the key switch 5. In other words, key switch 5 turns on or off the key switched loads 7. The key switched loads also include relay loads controlled by the key switch 5.

The on-board ESHM system 100 may also include a battery contactor 9, which may be used to connect and disconnect vehicle battery 2 to and from other devices under the control of ESHM 1. That is, ESHM 1 works in conjunction with battery contactor 9 that connects or disconnects the vehicle battery 2 to and from the intended electrical system.

Figure 2:
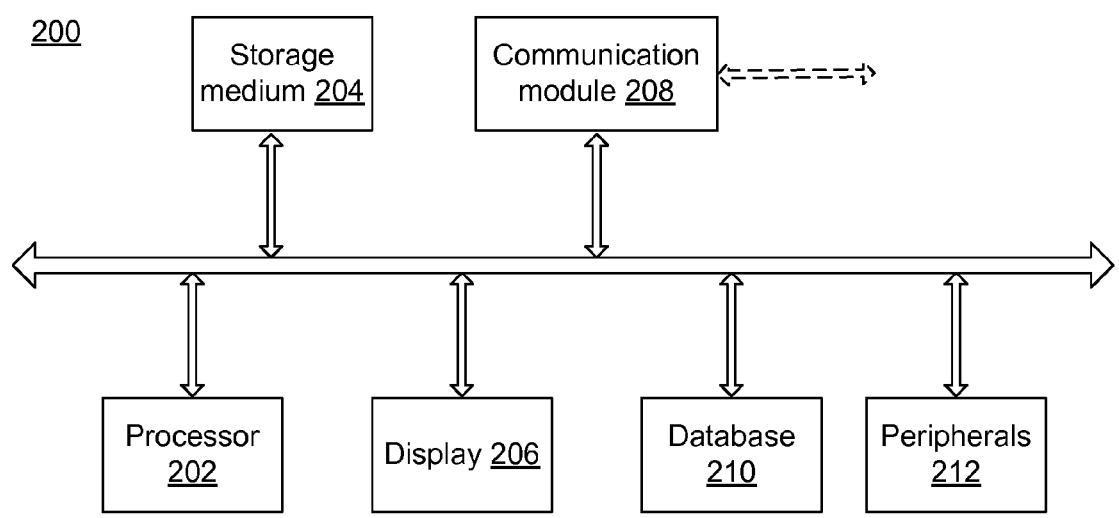
FIG. 2 illustrates an exemplary ESHM controller consistent with the disclosed embodiments.

ESHM controller 1 may include any appropriate computer-based system for control the ESHM system on-board the vehicle. FIG. 2 illustrates a computing system 200 implementing the ESHM controller 1 consistent with the disclosed embodiments.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Display 206 may include any appropriate display device configured to display certain information to an operator of the vehicle. Further, peripherals 212 may include various sensors, such as temperature sensors, and other I/O devices, such as current, voltage, and other vehicular parameter inputs and outputs. The communication module 208 may include certain network interface devices for establishing connections through communication networks. Database 210 may include one or more databases for storing certain data and for performing certain ESHM operations.

For example, software programs may be executed on ESHM controller 1 to process inputs and outputs to and from ESHM controller 1. Upon certain conditions, ESHM controller 1 may issue commands to control the battery contactor 9 to connect or disconnect the vehicle battery 2.

Returning to FIG. 1, during operation, ESHM 1 may utilize certain relationships of voltage waveforms to establish a health and operating state/mode of the vehicle electrical system. For example, as shown in FIG. 1, three voltages are monitored by ESHM 1: a battery voltage, designated as VBAT 10, an output of battery contactor 9, designated as VOUT 11, and a Key voltage, designated as VKEY 12.

ESHM 1 may, e.g., using algorithms implemented by embedded software, analyze the instantaneous and average values of these voltages, and compare the values with historical data and fault threshold values. This analysis may determine when CBM is required on the vehicle electrical system. ESHM 1 also controls the battery contactor 9 to open or close (i.e., disconnecting or connecting) based on the analysis and current conditions.

More specifically, these three voltages (e.g., VBAT 10, VOUT 11, and VKEY 12) are continuously sampled by ESHM 1. ESHM 1 may use these voltages values collectively to derive information that identifies certain operating states of the vehicle electrical system. For example, the relationship of these voltages may be used to determine four logic inputs defining the operating states of the vehicle electrical system. The four logic inputs may include Key (on/off), Engine (engine on and alternator charging/engine off), Contactor (battery disconnected/connected), and Starter (on or engaged/off). Further, the logic inputs may have binary values, such as a zero and a one. FIG. 4 illustrates an exemplary state diagram 400 indicating logic values of the logic inputs and operating states of the vehicle electrical system.

As shown in FIG. 4, based on Boolean algebra, a total of 16 operating states may be formed using the four logic inputs, as "Key value, Engine value, Contactor value, Starter value." However, among all 16 operating states, some of these operating states are not physically possible or are not applicable because of the series wiring arrangement in the electrical system. Such operating states are noted as not applicable or fault mode, such as operating state "0001" (fault mode: Key off, engine off, contractor disconnected, starter on), operating state "0011" (fault mode), operating state "0100" (fault mode), operating state "0101" (fault mode), operating state "0111" (fault mode with engine running), operating state "1001" (fault mode), operating state "1100" (fault mode), and operating state "1101" (fault mode), etc.

ESHM 1 may analyze all operating states and determine the fault mode states and a plurality valid operating states to monitor the health of the electrical systems of the vehicle and to perform certain action according to input values and the operating states of the vehicle. That is, ESHM 1 may monitor a predetermined set of input parameters corresponding to a particular operating state and may perform certain actions accordingly. The valid operating states may include operating state "0000" or Park state, operating state "0010" or Timeout state, operating state "1010" or Accessory state, operating state "1011" or Start state, and operating state "1110" or Run state. Other operating states may also be included.

The operating state "0000" or Park state refers to an operating state where the key is off, engine is off, contactor is open, and starter is off. While in the operating state "0000," ESHM 1 monitors the key to determine whether and when the key is in a closure position and, if the key is in a closure position, closes the battery contactor 9 to connect the vehicle battery 2. ESHM 1 also determines the open circuit voltage of the battery and ambient temperature, etc.

Specifically, as referring to FIG. 1, operating state "0000" may be an operating state of a parked vehicle that occurs after a predetermined period (after the timeout function). The battery contactor 9 is open (VOUT 11 is at 0 volts), and the entire electrical circuit may be without power except for ESHM 1. In this state, ESHM 1 enables the key monitor function. For example, the key monitor function periodically injects an electrical pulse to the vehicle electrical system through the VOUT terminal. At the same time, ESHM 1 monitors VKEY 12 for key closure. The key closure may be determined when the electrical pulse injected at VOUT 11 is present at VKEY 12. Other methods may also be used.

During the Park state or operating state "0000", ESHM 1 may determine an open circuit voltage (OCV) of the battery. True measurement of OCV for Pd-acid batteries (wet cell, gel or AGM) requires the battery to be at rest for at least 4 hours. In accordance, ESHM 1 monitors VBAT 10 as the OCV and records the value periodically (e.g., every two hours) for as long as the vehicle is parked (days, weeks, months). This establishes the OCV which is the initial condition for the next start cycle of the engine.

Similarly, ESHM 1 may measure and record the temperature at the module. ESHM 1 may also include one or more temperature sensor for measuring various temperature values. In general, after a time period, the temperature settles at or near ambient temperature. With the vehicle parked and the engine off, the entire vehicle, including batteries, starter, engine and all wiring is at or near ambient conditions. The voltage at VBAT 10 and temperature define the initial condition parameters for the next start cycle.

The operating state "0010" is a Timeout operating state for battery contactor 9. Specifically, also referring to FIG. 1, operating state "0010" may be initiated by an operator turning the key switch to off (VKEY~0). This action opens the circuit to key switched electrical loads 7, which subsequently shutdowns the engine and alternator 3 output. ESHM 1 initiates a timeout function before opening the battery contactor 9. The timeout may be based on programmed logic in accordance with requirement of other vehicle ECU (electrical control unit) or the vehicle manufacturers' requirements.

For example, an exhaust after-treatment system might require electrical power for several minutes after the engine is shutdown to ensure "diesel exhaust fluid" is properly drained back to the storage tank. The timeout function can also include communication with electronic control units via SAE J1939 or through a wireless communication interface. The timeout is also reset whenever certain devices, such as the vehicle hazard warning lights, are turned on, such that the hazard warning lights can operate independent of the key switch. That is, ESHM 1 may detect the operation of hazard lights and stop or delay disconnect the vehicle battery 2 when it is determined that the hazard lights are flashing. The ESHM 1 may also detect when an additional load is applied to the disabled electrical system and may reconnect the vehicle battery 2 and then determine if the additional load is hazard lights.

After the timeout period (without any reset), ESHM 1 opens the battery contactor 9, and the vehicle battery 2 is now disconnected and the operating state transitions to that of a Park state (i.e., a parked vehicle state) or operating state "0000."

The operating state "1110" or Run state refers to an operating state where the key is on with the engine running, contractor connected, and starter off. During this operating state, the primary function of ESHM 1 is to monitor the charging system and ensure there are no short circuits.

Figure 3:
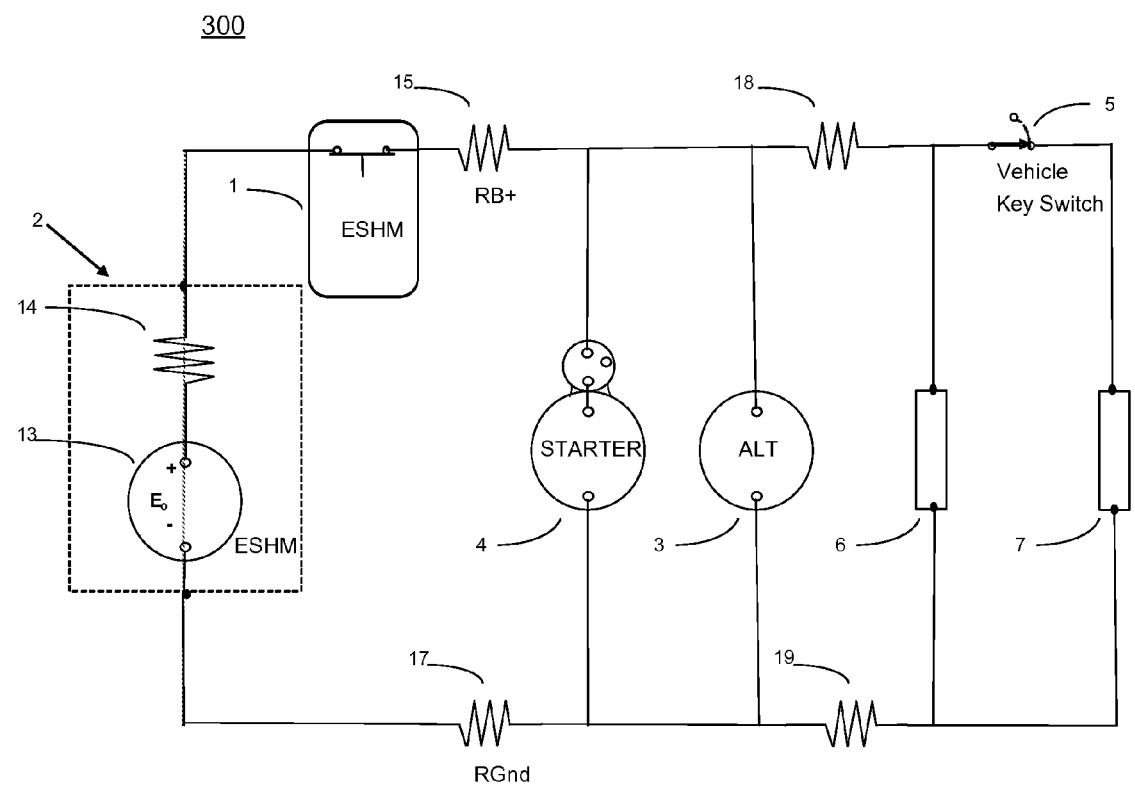
FIG. 3 illustrates another exemplary ESHM system consistent with the disclosed embodiments.

The Run state is the normal operating state after the engine starts. The vehicle may be in motion or stationary with the engine running. FIG. 3 shows an ESHM system 300 similar to the ESHM system 100 as in FIG. 1. However, in FIG. 3, the vehicle battery 2 is depicted as a voltage source $E_O$ 13 with series resistance 14. Likewise, the wires have series resistances 15, 17, 18, and 19 shown between components. These representations are consistent with modeling and pertinent in applying circuit analysis. The parametric values calculated from these elements are utilized by ESHM 1 to determine the health condition of the electrical system.

During the Run state, the starter 4 is disengaged and alternator 5 is normally generating electricity since the engine speed is in a normal operating range. VBAT10, VOUT 11, and VKEY 12 are monitored by ESHM 1 to verify the alternator and charging circuit are performing within known limits. The voltages VBAT10, VOUT 11, and VKEY 12 are normally above the OCV of the vehicle battery 2. Voltages near to the alternator 3 (i.e. 14.2 or higher for 12 volt systems) are indicative of alternator 3 charging. The current flowing into or out of the batteries and the current flowing into the electrical loads before or after the key are estimated by ESHM 1 by calculating the voltage drop (Vdrop) between VBAT 10 and VKEY 12.

The waveform at VKEY 12 also has the signature or characteristics of the alternator 3. For example, the ripple from full wave rectification of the alternator's three phases can be detected in the waveform at VKEY 12. Also, the presence of repetitive inductive spikes may signify the firing of electronic injectors (not shown). Typically (i.e. 6 cylinder 4-stroke internal combustion engine), the period covering 3 inductive spikes represent 1 engine rpm can be determined. In other words, 3 cylinders fire on each revolution, and the other 3 cylinders fire on the next revolution. The sequence repeats with the period always synchronized with engine speed. ESHM 1 can recognize the frequency correlation between the alternator waveform and the injection spikes.

Anomalies during the Run state may be determined from the voltage waveforms, current calculations, and/or trend analysis. The anomalies include, but not limited to, a low alternator output, an over voltage, and short circuits, etc.

ESHM 1 may determine the anomalies or out of tolerance values, and may set a diagnostic flag accordingly. Under certain conditions associated with the anomalies, ESHM 1 may cause the battery contactor 9 to be opened. For example, these conditions may include a short circuit between the battery 2 and the starter 4 or alternator 3, a vehicle rollover condition, or a safety related message sent through the communication network indicating an impact, rollover or thermo event.

The operating state "1010" or Accessory state refers to an operating state where the key is on with Engine off, Contractor on, and Starter off. During this state, ESHM 1 may monitor various voltages and calculate certain currents to determine predetermined conditions. If any of the predetermined conditions exists, the ESHM 1 may open the battery contactor 9.

More specifically, also referring to FIG. 1, the operating state "1010" or Accessory state is entered while the vehicle is stationary with the engine off. However, the key is on and the vehicle battery 2 is connected to the electronic system. The voltages are relatively constant (DC voltage), although pulsing from hazard warning lights and other cyclic loads may be present. The voltage differences between VOUT 11 and VKEY 12 reflect current drain of the battery. These values are relatively low except for the case of a short circuit. In the event of a short circuit (i.e., high values) detected by the ESHM 1, the battery contactor 9 is opened immediately. If ESHM 1 is programmed for low voltage protection, the battery contactor 9 may be opened at the threshold voltage set as a function of current drain and temperature.

The operating state "1011" or Start state refers to an operating state the battery contactor 9 is closed with engine off, starter 4 engaged, and key on. During this state, ESHM 1 may monitor and record the probability distribution of voltages and currents relevant to starting the engine. The expected or mean value is used for comparisons in determining the state of health of the cranking system.

More specifically, as referring to FIG. 3, this operating state is entered while the starter 4 is engaged. This operating state may only be active for a short duration. The starter 4 engagement is initiated by the turning the key switch 5 to the start position or using an equivalent push button or a remote start device. There is no output from Alternator 5 during the Start state. The waveforms at all three monitoring points (i.e., VBAT10, VOUT 11, and VKEY 12) may have a unique signature characterized by the very high current drawn by the starter 4. As the cranking speed increases, the current decreases proportionally to the counter-emf produced in a starter motor. The high current causes the battery voltage to drop by a measureable amount below the open circuit voltage E 13 because of the internal resistance 14.

ESHM 1 calculates the current flow during the Start state and the current flow for all states by applying Ohm's Law and imperial knowledge of the electrical system. The current (amperage) across an element(s) is the voltage drop divided by the resistance (Current=Vdrop/Resistance). The voltage drop during the Start state, between VBAT 10 and VKEY 12, is primarily the starter current (with instantaneous values between 2500 and 300 amps for a 12 volt system) and the current flowing in the electrical loads (values normally below 100 amps for a 12 volt system). Similar ratios apply to 24 volt systems.

The resistance may be predetermined or may be estimated using imperial knowledge. On new vehicles and vehicles that pass RP 129, the value of R-B+ 15 and R-Gnd 17 is equal to or less than 1 milliohm (0.5 volt drop @ 500 amps). Using this knowledge, the current may be estimated as, Current=Vdrop/0.001 ohms.

Further, during this operating state, ESHM 1 can recognize changes in system profile that are resulted from component degradation or wear, such as defective battery, corrosion of electrical terminals, or defective starter, etc.

The starter draws the maximum current at first engages when the engine is not turning over. The current decreases with increasing counter-emf resulted from increased engine speed. This relationship is intrinsic of DC starter motors, which may be direct drive type or the gear reduction type.

In operation, ESHM 1 may control the transition of the various operating states, and may recognize the state sequence by any appropriate algorithms, such as a pattern recognition technique.

For example, ESHM 1 may obtain the voltages and associated calculations based on the model as depicted in FIG. 3, and may analyze a finite number of samples during the start cycle. Further, the probability distribution may be determined. The mathematical expected value, EV or mean value, is calculated as the weighted average of all values during the interval. From a rigorous theoretical standpoint EV is the integral of the variables with respect to its probability measure.

As additional start cycles are evaluated, the variance is determined based on how far the values are spread out. This is analyzed for power out of the battery, power loss in the cables, high side, and ground side (Voltage drop times resistance), and power delivered to the starter (VKEY times amperage). Finally, the cranking system efficiency is calculated as Power in/Power Out=efficiency. Variations beyond the thresholds are indicative of some changes that warrant attention from the maintenance community. A warning alert is set and the data is date and time stamped.

ESHM 1 monitors the time interval for cranking the engine. The battery contactor 9 can be opened (optional function) after a defined period (e.g., 10 seconds) to protect components and allow battery voltage to recover. The battery contactor 9 is then opened for a finite period of time.

Returning to FIG. 4, there are other operating states in addition to the above described operating states (e.g., Timeout state, Park state, Run state, Accessory state, and Start state). ESHM 1 may determine other operating states being indicative of fault conditions and/or state transition conditions (e.g., operating state "0110" may be a transition state to the Timeout state, operating state "1000" may be a transition state to Accessory state). ESHM 1 may input the voltage waveforms in all operating states, and if there are fault states, ESHM 1 may record the input data and date stamped the occurrence of fault states. Further, ESHM 1 may set the fault flag and open the battery contactor 9 when appropriate.

That is, ESHM 1, via computer programs or prognostic software, may recognize operation outside of the normal operating states due to component failure, degradation, corrosion, wear or exterior factors adversely affecting normal operation. Specifically, the prognostic software may compare a family of start cycles as a function of ambient temperature and engine temperature (engine temperature is based on cool down time since last engine off event).

For example, a new vehicle by design may have a very low resistance in wiring between the new battery and starter (e.g., FIG. 3). The value may be less than 1 milliohm of resistance. The resistance increases with age and usage because of corrosion, component deteriorations, and inadequate maintenance. ESHM 1 may monitor the changes over time by comparing the voltage drop between VKEY 12 and VOUT 11. Applying Ohm's law, the difference voltage of (VOUT−VKEY) is proportional to the product of current and resistance (IR drop).

By tracking the IR drop over a period of time to establish a history of IR drop values, ESHM 1 can identify when a technician should perform shop maintenance if the IR is below a predetermined threshold. Diagnostic test can be used to isolate the problem (i.e. faulty battery, connector corrosion, starter in need of repair, etc.) and to make the repair. That is, ESHM 1 may store statistical data over a long period of time (e.g., months and years) for each operating state/mode (key on, key off, engine on, engine off, starter engaged/disengaged, etc.), perform trend analysis, compare with predetermined baseline data, and provide diagnostics and prognostic alerts for the operator or other related service provider.

Figure 5:
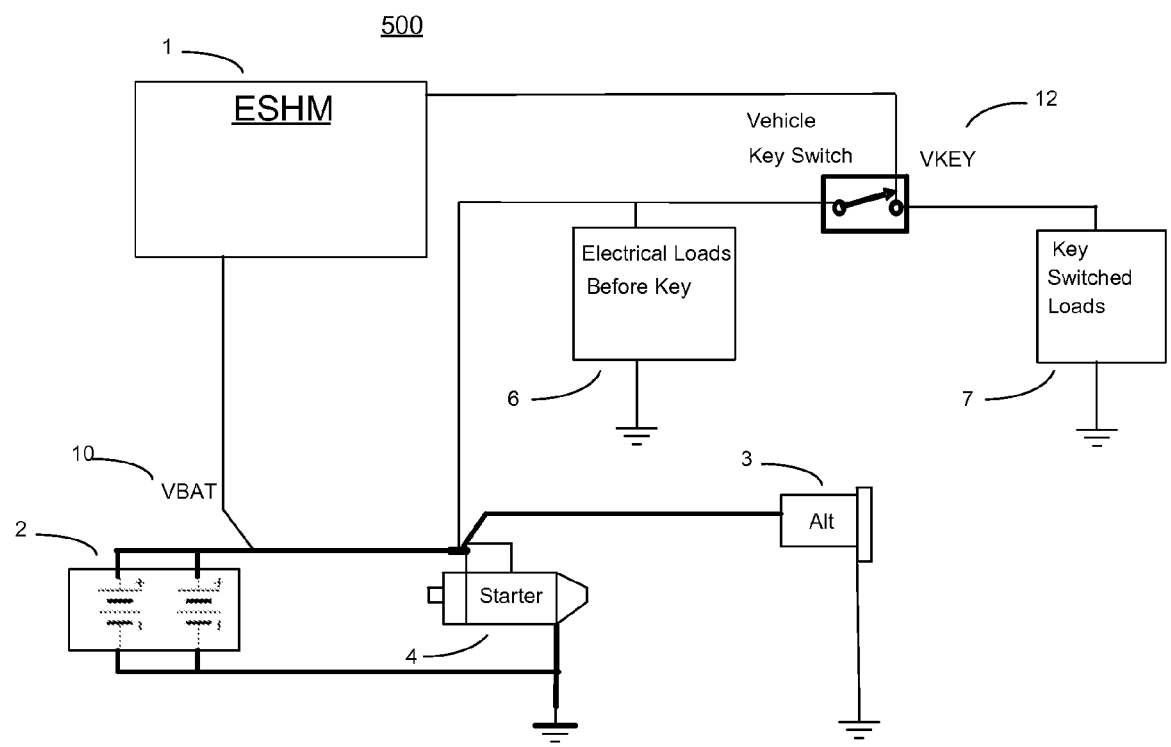
FIG. 5 illustrates another exemplary ESHM system consistent with the disclosed embodiments.

FIG. 5 illustrates another ESHM system 500. As shown in FIG. 5, ESHM system 500 may be similar to the ESHM system 100 shown in FIG. 1. However, there is no battery contactor in ESHM system 500, and only two voltage monitoring points (e.g., VBAT 10 and VKEY 12) are available. The voltage point VBAT 10 is monitored at the vehicle battery 2 and the voltage point VKEY 12 is monitored at key 5.

Similarly, ESHM 1 may determine the operating state from the relationship of these voltages and/or their waveforms. For example, ESHM 1 may determine a Park state: key off, engine off, and starter off; an Accessory state: key is on, engine off, and starter off; a Run state: key on, engine on, and starter off; and a Start state: key is on, engine is off, and starter on. Other states may also be used.

ESHM 1 may also determine that states outside of these four states are noted by exception and cannot be influenced or changed without a battery disconnect. For example, the presence of reflected spikes from injectors firing is evidence of the engine running. The absence of an alternator output or a distorted waveform characteristic due to certain fault states is evidence of alternator performance deterioration or failure. The prognostic software running on ESHM 1 is designed to recognize operation outside of the normal operating states due to component failure, degradation, corrosion, wear or exterior factors adversely affecting normal operation.

By using the disclosed systems and methods, various applications may be implemented using CBM concepts to monitor electrical system health utilizing prognostics methods to analysis real time data in relationship to the total vehicle electrical system. Such applications may effectively reduce the number of vehicles coming in for maintenance to only those that truly need service, and may reduce the need for corrective and preventive maintenance and their associated costs.

The disclosed ESHM system monitors the major electrical components and the related electrical circuit, and provides maintenance information so vehicles are pulled from service only when repairs are needed. For example, the battery(s) is near end of life (state of health less than 10%), corrosion of electrical connections or degradation of alternator output.

The disclosed systems and methods use the normal daily operation to measure the voltage drops without the need for routinely running off board diagnostics. Rather than maintain a fixed current and then measure voltage drop, disclosed ESHM system monitors the voltage probability distribution during the start cycle (battery and cranking circuit) and establishes expected values. The values are corrected for temperature to improve the accuracy of the measurement.

The disclosed systems and methods also determine the open circuit voltage or state of charge on the battery pack by recording the voltage for a parked vehicle after a period. This allows time for the surface charge to bleed off. During the next start, cycle the drop in voltage is used to estimate internal battery resistance and overall state of health.

Further, the disclosed ESHM system is an on-board health monitor system that provides condition based maintenance information thus reducing the risk of breakdown while in service and reducing the need for preventive maintenance on a fixed interval. Other applications, advantages, alternations, modifications, or equivalents to the disclosed embodiments are obvious to those skilled in the art.

What is claimed is:

1. An engine-powered vehicle, comprising:
   an engine for providing power to the vehicle;
   a battery configured to provide electrical power and corresponding to a battery voltage indicating an output voltage of the battery;
   a starter configured to start the engine using the electrical power provided by the battery;
   a plurality of switchable electrical loads;
   a key switch configured to control the electrical power to the switchable electrical loads and corresponding to a key voltage indicating a voltage at the key switch output;
   an electrical system health monitor (ESHM) controller configured to:
      monitor a plurality of voltages including at least the battery voltage and the key voltage;
      determine values of a plurality of logic inputs based on the plurality of voltages, wherein the plurality of logic inputs define a sequence of operating states; and
      determine an operating state from the sequence of operating states based on the values of the plurality of logic inputs;
      determine whether the operating state is a valid operating state or a fault state;
      when the operating state is a fault state, set a fault alert for vehicle maintenance; and
      when the operating state is a valid operating state, monitor a predetermined set of input parameters corresponding to the operating state, detect certain anomalies based voltage waveforms of the plurality of voltages, and perform a corrective action based on the anomalies.

2. The engine-powered vehicle according to claim 1, wherein:
   the valid operating state is one of a Park state, an Accessory state, a Run state, and a Start state.

3. The engine-powered vehicle according to claim 1, further including:
   a battery contactor configured to control open and close of the battery and corresponding to an out voltage indicating a voltage at the battery contractor output.

4. The engine-powered vehicle according to claim 3, wherein:
   the valid operating state is one of a Park state, a Timeout state, an Accessory state, a Run state, and a Start state, and
   when the operating state is in the Timeout state, the ESHM controller is further configured to:
      disconnect the battery after a timeout period;
      determine whether hazard lights of the vehicle are operational; and
      when the hazard lights are operational, reset the timeout period.

5. The engine-powered vehicle according to claim 3, wherein:
   the plurality of voltages includes the battery voltage, the out voltage, and the key voltage.

6. The engine-powered vehicle according to claim 5, wherein the ESHM controller is further configured to:
   store a history of difference between the out voltage and the key voltage;
   calculate a current difference between the out voltage and the key voltage;

determine whether the current difference is below a predetermined threshold based on the stored history of difference between the out voltage and the key voltage; and when the current difference is below the predetermined threshold, indicate a maintenance of the vehicle is required.

7. The engine-powered vehicle according to claim 1, wherein:
the plurality of logic inputs includes a first logic input indicating whether the key switch is on or off, a second logic input indicating whether the engine is on or off, a third logic input indicating whether the starter is on or off.

8. The engine-powered vehicle according to claim 7, wherein:
the plurality of logic inputs further includes a fourth logic input indicating whether the battery is open or closed.

9. The engine-powered vehicle according to claim 7, wherein:
the engine-powered vehicle further includes a battery contactor configured to control open and close of the battery and corresponding to an out voltage indicating a voltage at the battery contractor;
the valid operating state is one of a Park state, a Timeout state, an Accessory state, a Run state, and a Start state; and
the ESHM controller is further configured to:
determine a logic transition from key on to key off;
initiate a key timeout period for opening the battery contactor; and
switch to the Park state by opening the battery contactor after the key timeout period.

10. The engine-powered vehicle according to claim 9, wherein the ESHM controller is further configured to:
when the battery contactor is open, inject an electrical pulse without turning on power of the vehicle; and
determine a transition from key off to key on based on the injected electrical pulse.

11. The engine-powered vehicle according to claim 10, wherein the ESHM controller is further configured to:
switch to the Accessory state by closing the battery contactor after the logic transition from key off to key on is determined.

12. The engine-powered vehicle according to claim 1, further including:
an alternator coupled to the engine to generate electrical power for the battery when the engine is running.

13. The engine-powered vehicle according to claim 1, further including:
one or more temperature sensor configured to provide values of ambient temperature,
wherein the ESHM controller is further configured to determine initial values of the plurality of voltages based on an open circuit voltage of the battery and the ambient temperature.

14. A method performed by an on-board electrical system health monitor (ESHM) system in an engine-powered vehicle containing an engine for providing power to the vehicle, a battery configured to provide electrical power and corresponding to a battery voltage indicating an output voltage of the battery, a starter configured to start the engine using the electrical power provided by the battery, a plurality of switchable electrical loads, and a key switch configured to control the electrical power to the switchable electrical loads and corresponding to a key voltage indicating a voltage at the key switch output, the method comprising:

monitoring, using the on-board electrical system health monitor system, a plurality of voltages including at least the battery voltage and the key voltage;
determining values of a plurality of logic inputs based on the plurality of voltages, wherein the plurality of logic inputs define a sequence of operating states; and
determining an operating state from the sequence of operating states based on the values of the plurality of logic inputs;
determining whether the operating state is a valid operating state or a fault state;
when the operating state is a fault state, setting a fault alert for vehicle maintenance; and
when the operating state is a valid operating state, monitoring a predetermined set of input parameters corresponding to the operating state, detecting certain anomalies based voltage waveforms of the plurality of voltages, and performing a corrective action based on the anomalies.

15. The method according to claim 14, wherein:
the valid operating state is one of a Park state, an Accessory state, a Run state, and a Start state.

16. The method according to claim 4, wherein:
the vehicle further includes a battery contactor configured to control open and close of the battery and corresponding to an out voltage indicating a voltage at the battery contractor output;
the valid operating state is one of a Park state, a Timeout state, an Accessory state, a Run state, and a Start state, and
when the operating state is in the Timeout state, the method further includes:
disconnecting the battery after a timeout period;
determining whether hazard lights of the vehicle are operational; and
when the hazard lights are operational, resetting the timeout period.

17. The method according to claim 14, wherein:
the vehicle further includes a battery contactor configured to control open and close of the battery and corresponding to an out voltage indicating a voltage at the battery contractor output; and
the plurality of voltages includes the battery voltage, the out voltage, and the key voltage.

18. The method according to claim 17, wherein:
the plurality of logic inputs includes a first logic input indicating whether the key switch is on or off, a second logic input indicating whether the engine is on or off, a third logic input indicating whether the starter is on or off, and a fourth logic input indicating whether the battery contactor is open or closed.

19. The method according to claim 14, wherein:
the vehicle further includes one or more temperature sensor configured to provide values of ambient temperature; and
the method further includes determining initial values of the plurality of voltages based on an open circuit voltage of the battery and the ambient temperature.

20. The method according to claim 19, further including:
storing a history of difference between the out voltage and the key voltage;
calculating a current difference between the out voltage and the key voltage;
determining whether the current difference is below a predetermined threshold based on the stored history of difference between the out voltage and the key voltage; and when the current difference is below the predetermined threshold, indicating a maintenance of the vehicle is required.

* * * * *